(12) United States Patent
Eriksson

(10) Patent No.: US 7,929,803 B2
(45) Date of Patent: Apr. 19, 2011

(54) IMAGE PROCESSING

(75) Inventor: Andreas Lars Gunnar Eriksson, Stockholm (SE)

(73) Assignee: Elekta AB (publ), Stockholm (SE)

( * ) Notice: Subject to any disclaimer, the term of this patent is extended or adjusted under 35 U.S.C. 154(b) by 969 days.

(21) Appl. No.: 11/794,075

(22) PCT Filed: Dec. 15, 2005

(86) PCT No.: PCT/EP2005/013488
§ 371 (c)(1),
(2), (4) Date: Jun. 22, 2007

(87) PCT Pub. No.: WO2006/066791
PCT Pub. Date: Jun. 29, 2006

(65) Prior Publication Data
US 2008/0166066 A1    Jul. 10, 2008

(51) Int. Cl.
*G06K 9/32* (2006.01)
*G06K 9/00* (2006.01)
(52) U.S. Cl. ......................... 382/294; 382/128
(58) Field of Classification Search .......... 382/128–134, 382/293, 294–296; 600/407
See application file for complete search history.

(56) References Cited

U.S. PATENT DOCUMENTS

| | | | | |
|---|---|---|---|---|
| 5,633,951 A * | 5/1997 | Moshfeghi | | 382/154 |
| 6,266,453 B1 * | 7/2001 | Hibbard et al. | | 382/294 |
| 6,882,744 B2 * | 4/2005 | Oosawa | | 382/132 |
| 7,142,723 B2 * | 11/2006 | Kang et al. | | 382/254 |
| 7,426,289 B2 * | 9/2008 | Meier et al. | | 382/128 |
| 7,639,896 B2 * | 12/2009 | Sun et al. | | 382/294 |
| 7,646,936 B2 * | 1/2010 | Nord et al. | | 382/294 |
| 2002/0027564 A1 | 3/2002 | Taylor | | |

OTHER PUBLICATIONS

Ledesma-Carbaya M J et al: "Spatio-temporal nonrigid registration for ultrasound cardiac motion estimation", IEEE Transactions on Medical Imaging IEEE USA, vol. 24, No. 9, Sep. 2005 pp. 1113-1126 XP007900117.
Huber DF et al: "Fully automatic registration of multiple 3D data sets", Image and Vision Computing Elsevier Netherlands, vol. 21, No. 7, Jul. 1, 2003, pp. 637-650, XP007900118, ISSN:0262-8856.
Williams J et al: "Simultaneous Registration of Multiple Corresponding Point Sets", Computer Vision and Image Understanding, Academic Press, San Diego, CA, US, vol. 81, No. 1, Jan. 2001, pp. 117-142, XP004434117, ISSN: 1077-3142, whole document.

* cited by examiner

*Primary Examiner* — Kanji Patel
(74) *Attorney, Agent, or Firm* — Nelson Mullins Riley & Scarborough LLP; Anthony A. Laurentano

(57) ABSTRACT

Methods for the registration of images typically assume that there are only two images, an assumption that is not always valid. By using the remaining images to obtain a choice of paths between two selected images, the transformation between the two can be determined with greater accuracy by averaging those paths. When averaging the paths, greater weight can be given to paths whose accuracy is known or reasonably believed to be greatest. Iteration of the process may be possible, where the available computation power is available.

13 Claims, 2 Drawing Sheets

IMAGE PROCESSING

RELATED APPLICATIONS

This application is a 35 U.S.C. 371 national stage filing of International Application No. PCT/EP2005/013488 filed 15 Dec. 2005, which claims priority to Great Britain Patent Application No. 0428175.4 filed on 23 Dec. 2004 in Great Britain. The contents of the aforementioned applications are hereby incorporated by reference.

FIELD OF THE INVENTION

The present invention relates to image processing methods. The methods provided by the invention find particular use in the processing of images obtained from medical investigative tools such as CT, MRI, PET, portal images, and others.

BACKGROUND ART

One of the most commonly used image processing methods is that of co-registering pictures to each other, i.e. transforming one image to the reference system of another image so that they can be compared directly or even merged. A common example is for a CT image taken on one occasion to be compared with an MRI image taken on another occasion. The process of registration of one image with the other makes it possible for the user directly to compare the images correctly, or enables a fusion of the images whereby both images are combined to a single image.

Both automatic and manual methods of doing so exist at present.

SUMMARY OF THE INVENTION

Hitherto, methods for the registration of images have assumed that there are only two images. Where more than two images are to be registered, these have been co-registered in appropriate pairs, using the same techniques.

The present invention is based on a realisation that this assumption is often incorrect. In the medical field (for example) there are often many images of a patient, derived at different times via different investigative apparatus. The registration of these multiple images provides an opportunity to improve the accuracy of registration of chosen pairs of images within that multiplicity.

In general, the registration process involves the identification of (in general terms) 'n' transformation steps, such as a translation in both the x and y directions, a rotation, a scaling, and other degrees of freedom, all of which when applied together and in an appropriate order will transform one image into the other. Clearly, 'n' will vary with the intended accuracy of the transformation, in terms of the number and type of steps that are to be carried out, and with the number of dimensions of each of the images. A pair of two-dimensional images that are translated in two directions, rotated, and scaled in two directions will thus give rise to a five-dimensional vector. In general, the factors can be considered to form a single n-dimensional vector quantity, representing the overall transformation that is required. This vector will be referred to herein as a 'registration vector'.

This vector approach allows the registration process to be conceptualised in the familiar terms of vector relationships, from which an understanding of the invention can be derived. Assuming a simple case of three images (A, B and C), these will define three points in the relevant n-dimensional space and the registration vectors will represent the displacements necessary to move from one point to another. Thus, to reach B from A, it is possible to use the single transformation that links the two points, or to move first via the transformation A to C followed by the transformation C to B.

In general, having obtained registration vectors for each of the three paths linking the three images, and thus both the single path vector A-B and the composite vector A-C-B, these two vectors will not be precisely equal as theory demands. This difference between the two possible paths from A to B represents the errors present in both; each will be an imperfect approximation to a theoretically perfect but unknown vector that represents the actual (ideal) transformation. However, given that it is to be expected that random errors in the vectors will outweigh systematic errors, it will be apparent that an average of the two path vectors will more closely approximate to the actual transformation.

Thus, the present invention is based on the realisation that by using the remaining images to obtain a choice of paths between the two selected images, the true transformation between the two can be determined with greater accuracy by averaging those paths. This is, at first sight, counterintuitive. It would be expected that the contribution of the indirect paths would result in a reduction in overall accuracy, given that they rely on the summation of a plurality of imperfect approximations. However, this is not in fact the case, since the third image (and any subsequent images) offer new information not present in the two selected images, which can be used to improve the accuracy of the overall method.

It is to be preferred that, when averaging the paths, greater weight is given to paths whose accuracy is known or reasonably believed to be greatest. It may be possible to place an a priori expectation of accuracy on certain paths, since they may involve the registration of images that have greater fidelity, or which have registration marks included in the image, for example. It is also possible to estimate the registration accuracy based on analysis of the image detail.

It will be appreciated that the method is readily applicable to more than three images, with the greater number of possible paths allowing a wider average to be taken.

Iteration of the process may be possible, where the available computation power is available.

BRIEF DESCRIPTION OF THE DRAWINGS

An embodiment of the present invention will now be described by way of example, with reference to the accompanying figures in which.

DETAILED DESCRIPTION OF THE EMBODIMENTS

The challenge lies in obtaining the most accurate co-registration as possible. Many contexts require an error of less than 1 mm for the resulting output to be clinically useful. In non-ideal situations where the images have a poor resolution, poor contrast or contain artefacts, or when difficult combinations such as PET to CT are presented, known methods can face difficulties in obtaining the necessary level of accuracy.

A further problem with existing automatic methods of registration is that there is no established quality measure for the predicted level of accuracy. In manual registration, where the user places a number of landmarks on both images, it is possible to calculate an estimation of the registration error. No corresponding possibility for automatic methods exists. The user must therefore rely on a purely visual inspection of the result.

All present registration techniques, both automatic and manual, use a target image and a reference image. The aim with the co-registration process is to transform the target image on to the reference image. Often, however, the user has access to more than two images. An example might be a frameless PET image taken prior to treatment, which is to be co-registered with a CT image and an MRI image taken, with a frame and indicator box, just prior to treatment. The co-registration of the CT and MR-image is obtained directly by identifying the fiducials of the indicator box. The target image (the PET image) is thereafter typically registered on either the CT image or the MRI image acting as a reference image.

This presents an opportunity to improve the process, compared to prior art methods, by using the information that the third image contains.

Figure 1:
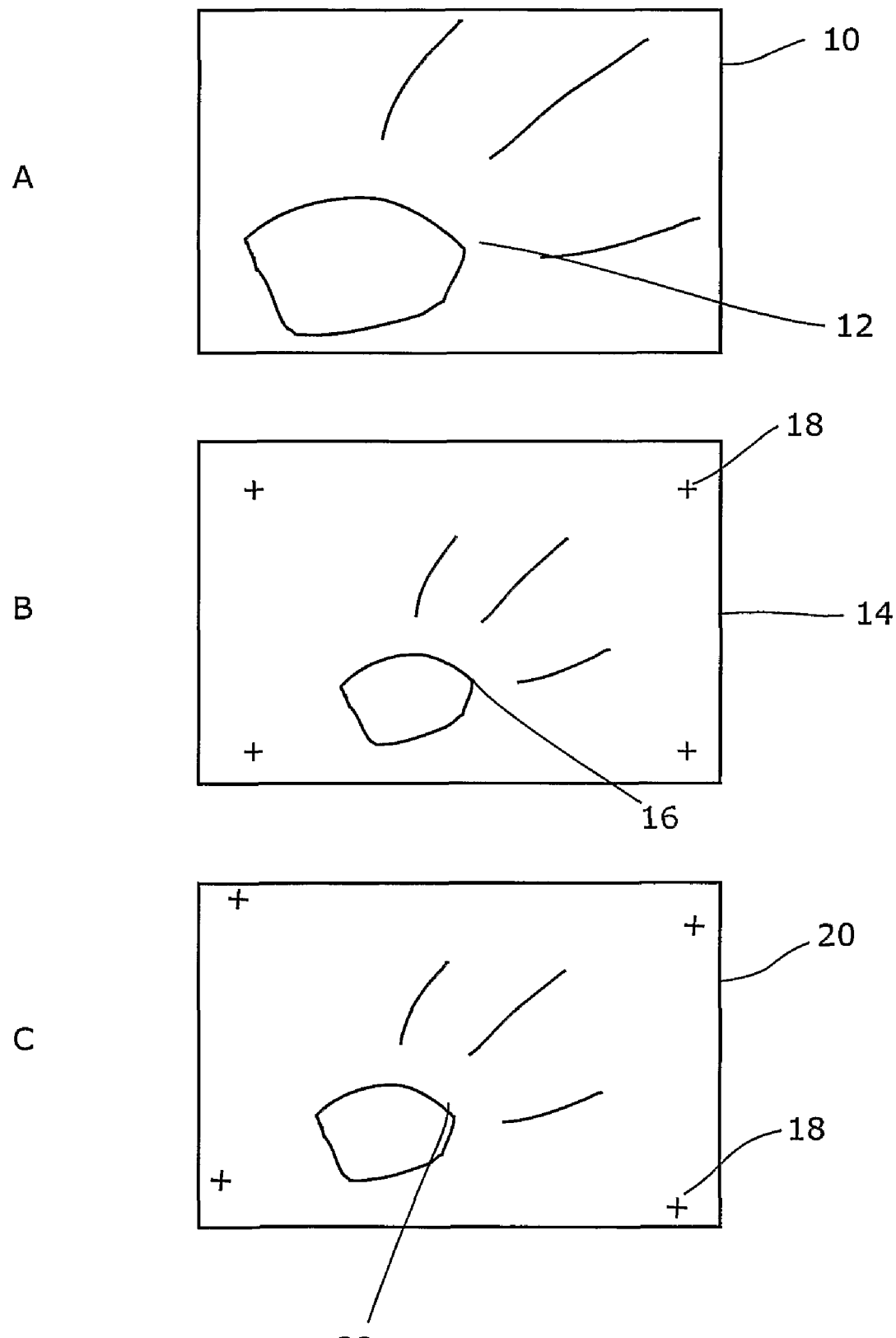
FIG. 1 shows a schematic set of three images and the transformation required between them.

Referring to FIG. 1, this shows three sample images by way of schematic representation. The first image 10, designated 'A' contains no registration information but simply includes anatomical detail 12 of the patient. This is typical of a PET image, for example. The second image 14, designated 'B', contains the same anatomical detail 16 but in a different reference frame. In simple terms, this means that the images are essentially of the same general area of the patient, but may be subject to (for example) translation, rotation and scaling so that the two are not directly comparable. Image B may, for example, represent a CT image and is thus shown with reference marks 18.

Finally, the third image 20, designated 'C', again contains the same anatomical detail 22 but is set in a third reference frame. This might, for example, be an MRI image. Images of the same reference markers 18 are visible, in different image locations reflecting the differences between the second and third reference frames.

Thus, the co-registration between A and B can be calculated directly or be obtained by the merging of co-registrations A-C and C-B. By calculating the weighted mean value (in the manner described below) between the co-registration A-B and the merged co-registration A-C-B, the expected error can be lowered by a factor $$1 - \frac{\sqrt{k_{ac}^2 + k_{cb}^2}}{\sqrt{1 + k_{ac}^2 + k_{cb}^2}}$$

as explained below, where $k_{ac}$ is the standard deviation for the error in the A-C coregistration divided with the error in the A-B coregistration and where $k_{cb}$ is the standard deviation of the error in the C-B coregistration divided with the error in the A-B coregistration.

If we suppose that all registrations are just as good, i.e. $k_{ac}=k_{cb}=1$, the expected error is lowered by 18%. Of course, in this example the coregistration C-B is expected to have half the error of the A-B and A-C coregistrations, since it is calculated using the indicator box, thereby giving a better result (particularly if the images are of poor quality). In this case, the expected error is lowered by more than 25%.

It is noteworthy that the expected error is always lower, even if the coregistrations of A-C and B-C have an expected error greater than that of coregistration of A-B. The method still works well with more than three images, and then gives even higher gains.

The method can be summarized as follows.

Let each image be a node in a graph. A calculated co-registration between two images forms an edge between corresponding nodes. Each image is thus registered on each other image. A coregistration between two selected images is obtained as the weighted mean value of all paths between the images/nodes, where the weights are calculated from an estimation of the variance of each registration, and is chosen so as to minimize the variance in the result. The deviation between the different paths can be used as a measure of the quality of the registration. If landmark-based registration is used, then any of the the usual error estimates could be used to estimate the variance of each registration. Otherwise, an estimation using the images' voxel size could be used. The expected error of the resulting registration is always lower compared with the direct registration.

Figure 2:
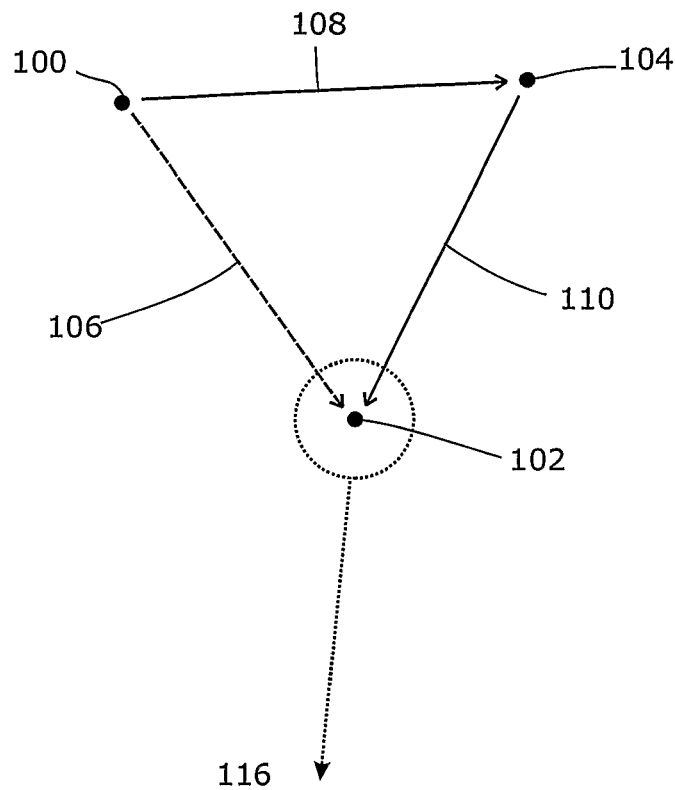
FIG. 2 shows a representation in two dimensions of a hypothetical path set consisting of three images.

FIG. 2 shows such a graph. Image A is denoted at 100, Image B at 102 and Image C at 104. The direct registration vector from A to B is shown as edge 106. However, it will be seen that it is also possible to reach B via image C, i.e. from 100 via edge 108 to image C at 104, then via edge 110 to reach image B at 102.

Figure 3:
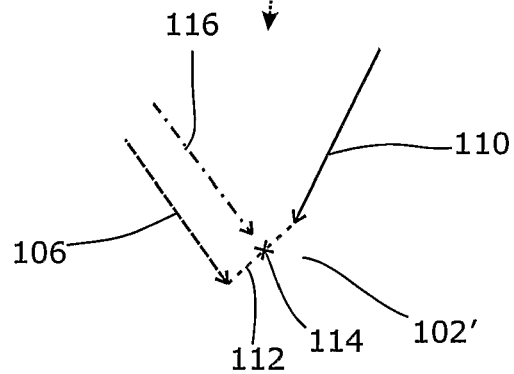
FIG. 3 shows the averaging process and the consequent reduction in error.

As shown in FIG. 3, an enlarged part of FIG. 2, image B lies somewhere in the region denoted 102'. The end points of registration vectors 106 and 110 do not co-incide exactly; there is a gap 112 between them. An average point 114 along the line connecting the end points of registration vectors 106 and 110 will give a better indication of the end point of the "true" registration vector 116. As shown, the average point 114 is midway between the two end points, but the weighting applied may affect this. In addition, the true registration vector 116 is shown between the measured vectors 106, 110 based on the assumption that systematic errors are outweighed by random errors.

Figure 4:
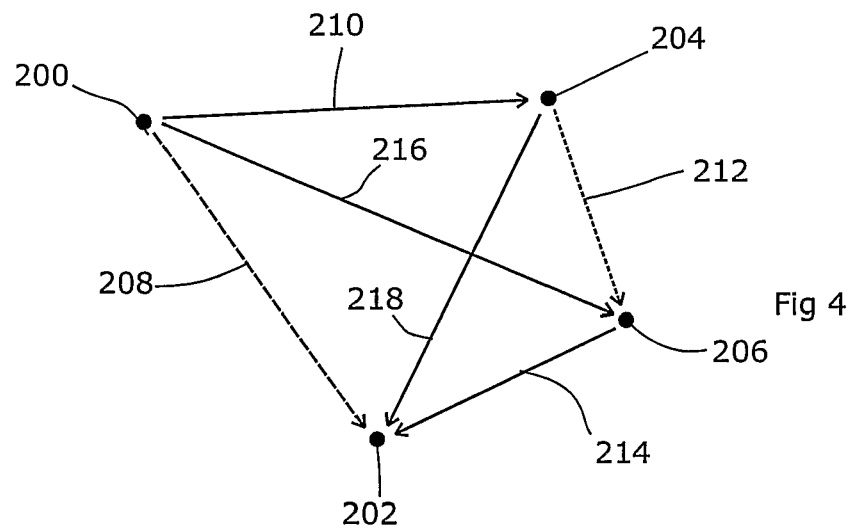
FIG. 4 shows a representation in two dimensions of a hypothetical path set consisting of four images.

FIG. 4 shows an example involving four images A, B, C and D. In this case, there are multiple paths from A to B;

| Images | Route |
|---|---|
| A-B | 200: 208: 202 |
| A-C-B | 200: 210: 204: 218: 202 |
| A-D-B | 200: 216: 206: 214: 202 |
| A-C-D-B | 200: 210: 204: 212: 206: 214: 202 |
| A-D-C-B | 200: 216: 206: −212: 204: 218: 202 |

It may be preferable to use some or all of these additional paths. The greater number of paths will offer more composite registration vectors, but will increase the computational load. A balance may have to be struck in the light of the available computational effort, the required accuracy, and the time available.

Calculation of the Weighted Mean Value

Let a, b and c be three images, and suppose that a should be registered to b. Let $T_{ab}$ be the registration between a and b, and define $T_{ac}$ and $T_{cb}$ accordingly. Let $T_{acb}$ be the registration between a and b that is obtained by composing $T_{ac} T_{cb}$. The registration T between a and b is given by the weighted average $$T = \alpha T_{ab} + (1-\alpha) T_{acb}, \alpha \in (0,1)$$

Let $X_{ab}$, $X_{ac}$ and $X_{cb}$ be the stochastic error in $T_{ab}$, $T_{ac}$ and $T_{cb}$. The stochastic error X for T is thus (since the errors are additive)

$$X = \alpha X_{ab} + (1-\alpha)(X_{bc} + X_{cb})$$

It can be assumed that $X_{ab}$, $X_{ac}$ and $X_{cb}$ are independent and have expectation values of 0. The error X is thus minimized when the variance V[X] is minimized according to $$\min_{\alpha \in (0,1)} V[X] = \alpha^2 \sigma_{ab}^2 + (1-\alpha)^2 (\sigma_{ac}^2 + \sigma_{cb}^2)$$

where $\sigma_{ab}^2 = V[X_{ab}]$, $\sigma_{ac2} = V[X_{ac}]$ and $\sigma_{cb}^2 = V[X_{cb}]$. These can be estimated from (for example) the voxel sizes of the images, or by using one of the existing error estimates for manual co-registrations. Let $\sigma_{ac} = k_{ac}\sigma_{ab}$ and $\sigma_{cb} = k_{cb}\sigma_{ab}$, then $$\min_{\alpha \in (0,1)} V[X] = \sigma_{ab}^2 [\alpha^2 + (1-\alpha)^2 (k_{ac}^2 + k_{cb}^2)]$$

which assumes its minimum for $$\alpha = \frac{k_{ac}^2 + k_{cb}^2}{1 + k_{ac}^2 + k_{cb}^2}$$

This gives $$V[X] = \sigma_{ab}^2 \frac{k_{ac}^2 + k_{cb}^2}{1 + k_{ac}^2 + k_{cb}^2}$$

The standard deviation $D[X] = \sqrt{V[X]}$ is thus lower than $D[X_{ab}]$ with a factor $$1 - \frac{\sqrt{k_{ac}^2 + k_{cb}^2}}{\sqrt{1 + k_{ac}^2 + k_{cb}^2}} > 0$$

Given that this factor is greater than zero even for $k_{ac} = k_{cb} = 1$, it follows that the use of additional images to provide alternate paths is a useful means for improving the registration accuracy of the selected pair of images.

It will of course be understood that many variations may be made to the above-described embodiment without departing from the scope of the present invention.

The invention claimed is:

1. An image registration method implemented by an image analysis apparatus for determining a registration vector between two selected images of a group of at least three related images, the method comprising;
    a. determining a set of registration vectors, each being between a respective pair of images in the group;
    b. determining, from the set of registration vectors, at least one composite registration vector leading from one selected image to the other selected image via at least one image other than the selected images;
    c. determining an optimized registration vector, being the average of a plurality of registration vectors selected from:
        i. the registration vector between the selected images
        ii. the at least one composite registration vector.

2. The image registration method according to claim 1 including the step of estimating deviation errors in the plurality of registration vectors, and in which the average is weighted according to deviation error associated with each respective registration vector of the plurality.

3. The image registration method according to claim 1 in which the one selected image is subsequently transformed according to the optimized registration vector.

4. The image registration method according to claim 3 in which, subsequent to transformation, the one selected image is merged with the other selected image.

5. A medical investigation tool arranged for an image registration for determining a registration vector between two selected images of a group of at least three related images by a series of steps comprising:
    a. determining a set of registration vectors, each being between a respective pair of images in the group;
    b. determining, from the set of registration vectors, at least one composite registration vector leading from one selected image to the other selected image via at least one image other than the selected images;
    c. determining an optimized registration vector, being the average of a plurality of registration vectors selected from;
        i. the registration vector between the selected images
        ii. the at least one composite registration vector.

6. The image analysis tool according to claim 5 including an instruction to estimate deviation errors in the plurality of registration vectors, and weight the average according to deviation error associated with each respective registration vector of the plurality.

7. The image analysis tool according to claim 5 containing instructions to transform the one selected image according to the optimized registration vector.

8. The image analysis tool according to claim 7 containing instructions to merge the one selected image with the other selected image, subsequent to transformation.

9. Image analysis apparatus arranged to determine a registration vector between two selected images of a group of at least three related images by a series of steps comprising;
    a. determining a set of registration vectors, each being between a respective pair of images in the group;
    b. determining, from the set of registration vectors, at least one composite registration vector leading from one selected image to the other selected image via at least one image other than the selected images;
    c. determining an optimized registration vector, being the average of a plurality of registration vectors selected from;
        i. the registration vector between the selected images
        ii. the at least one composite registration vector.

10. Image analysis apparatus according to claim 9 further arranged to estimate deviation errors in the plurality of registration vectors, and to weight the average according to deviation error associated with each respective registration vector of the plurality.

11. Image analysis apparatus according to claim 9 arranged to transform the one selected image to the optimized registration vector.

12. Image analysis apparatus according to claim 11 arranged to merge the one selected image the other selected image, subsequent to transformation.

13. Image analysis apparatus according to claim 9 in which the images are images of a patient, derived from medical investigative apparatus.

* * * * *

UNITED STATES PATENT AND TRADEMARK OFFICE
CERTIFICATE OF CORRECTION

| | | |
|---|---|---|
| PATENT NO. | : 7,929,803 B2 | Page 1 of 1 |
| APPLICATION NO. | : 11/794075 | |
| DATED | : April 19, 2011 | |
| INVENTOR(S) | : Eriksson | |

It is certified that error appears in the above-identified patent and that said Letters Patent is hereby corrected as shown below:

On the Title page, column 1, please insert the following new field:

Item -- (30) Foreign Application Priority Data: December 23, 2004 (GB)----0428175.4 --

Signed and Sealed this
Sixteenth Day of August, 2011

David J. Kappos
*Director of the United States Patent and Trademark Office*